Jan. 10, 1939.  W. E. GOBLE  2,143,193
DISK BEDDER
Filed June 8, 1938  2 Sheets-Sheet 1
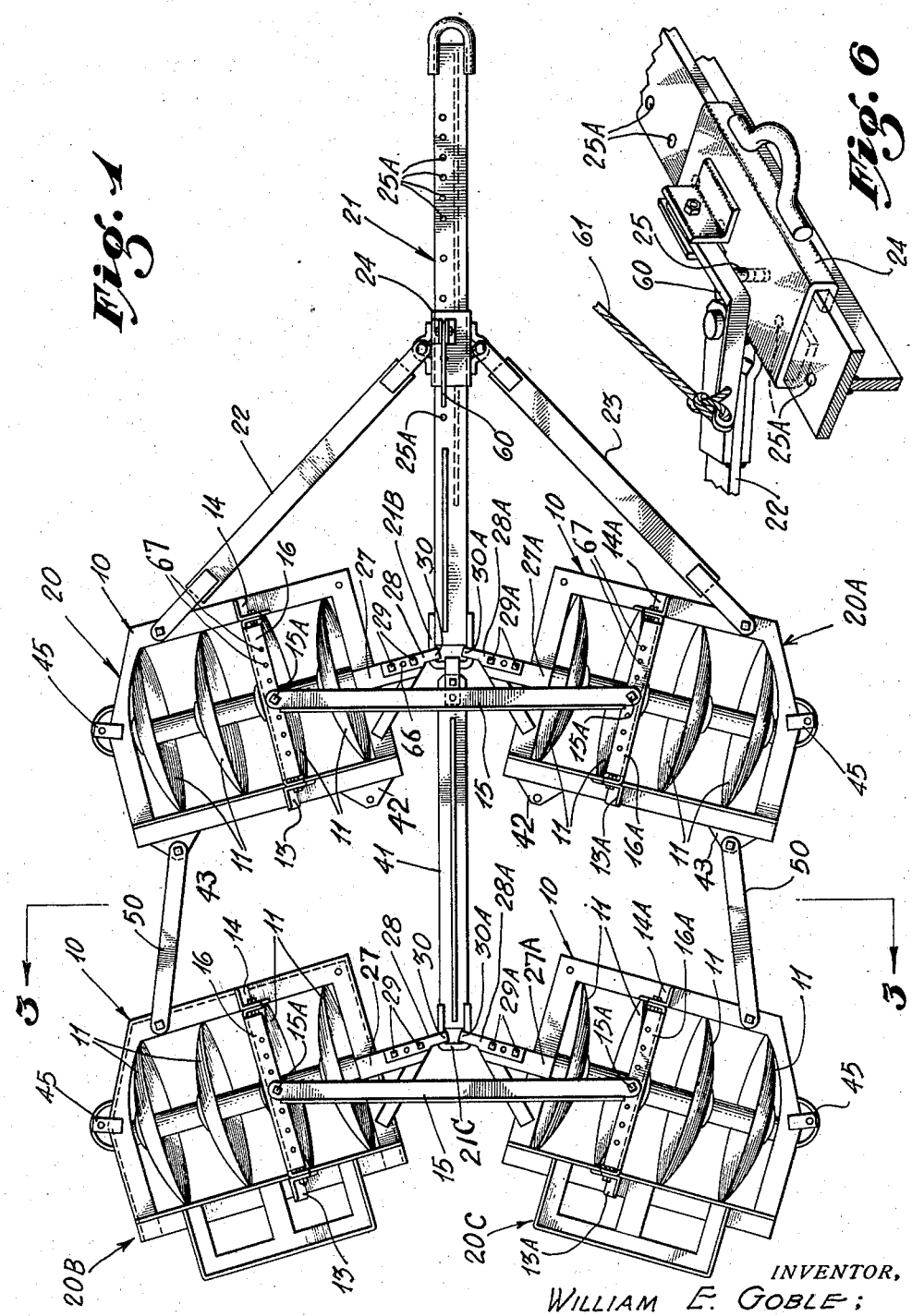
INVENTOR,
WILLIAM E. GOBLE;
BY
Francis C. Huebner
ATTORNEY.

Jan. 10, 1939.  W. E. GOBLE  2,143,193
DISK BEDDER
Filed June 8, 1938  2 Sheets-Sheet 2
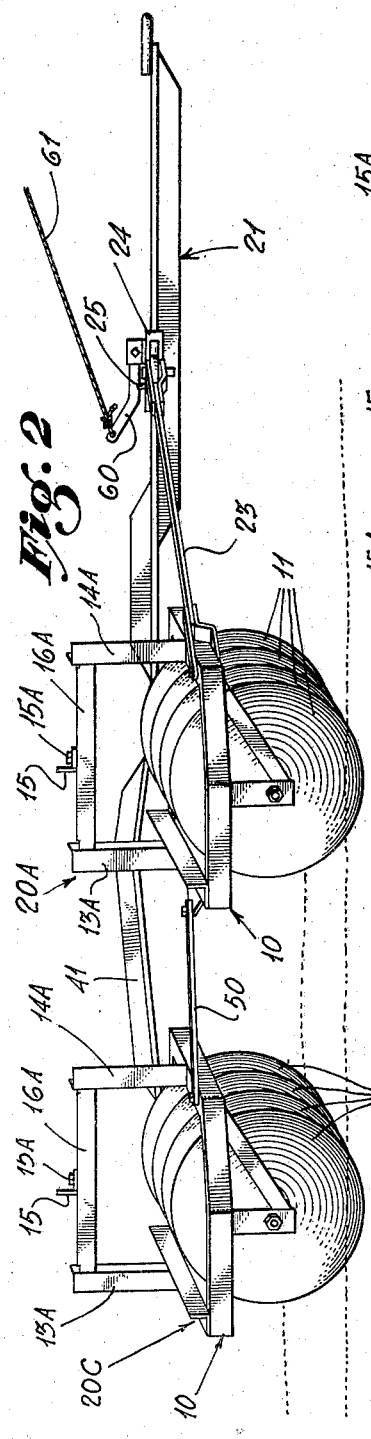
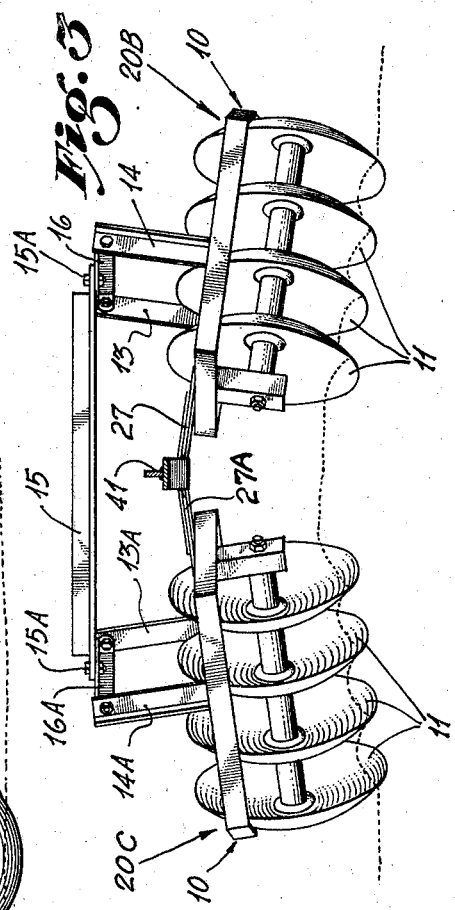
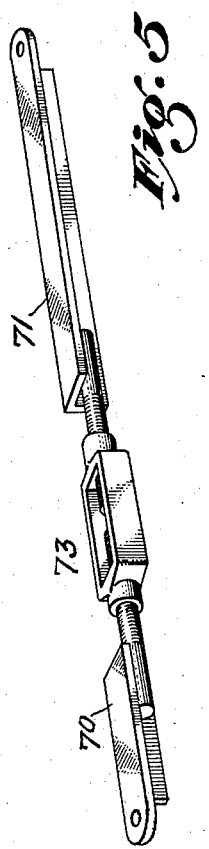
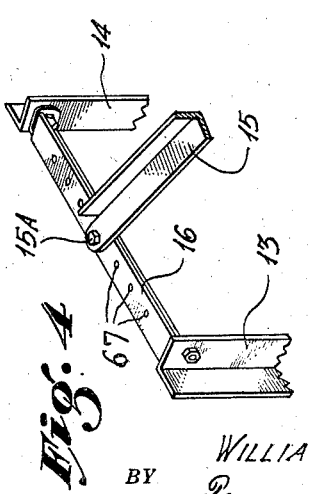
INVENTOR:
WILLIAM E. GOBLE,
BY Francis C. Huebner,
ATTORNEY.

Patented Jan. 10, 1939

2,143,193

UNITED STATES PATENT OFFICE 2,143,193

DISK BEDDER

William E. Goble, Fowler, Calif.

Application June 8, 1938, Serial No. 212,495

11 Claims. (Cl. 55—83)

My invention relates to an earth working tool, and more specifically to what is commonly known as a bedder. In farming in certain sections of the country it is desirable to prepare beds of earth which has been thoroughly loosened, the beds being elevated as compared with the space between the beds, and having a gentle slope from the center line. These beds are thus prepared for planting certain varieties of vegetation.

The object I have accomplished is the construction of a tool for forming beds of the character described by dragging the tool over the earth where the beds are to be made. The tool is simple in construction, easy to operate, and perfectly performs the functions for which it is intended. Another object is to use the tool for forming ridges for irrigation. Another object is to use the tool with the disk blades reversed to throw the earth from the center line when it can be used for leveling beds and ridges. Other objects will be hereinafter disclosed in this specification.

In the drawings which accompany this specification and which are hereby made a part thereof, Fig. 1 is a top plan view of the tool complete with the tongue for attaching draft means, showing four sections as comprising the tool, the sections being arranged for making the bed. Fig. 2 is a side elevation with the sections angled as shown in Fig. 1, having the angling and draft attachment connected therewith. Fig. 3 is an end elevation which discloses a view of the duplicate spacing bars. Fig. 4 is an enlarged fractional view of the standards, connecting bar and tie which form one of the duplicate spacers connecting the sections. Fig. 5 is a modified form of an adjustable tie or spacer. Fig. 6 is a perspective view of a sliding block and latch mounted on the fractional view of a tongue.

Referring to the drawings, I have constructed frames 10. In each frame are assembled a plurality of disk blades 11, the blades in each frame being assembled so they are free to rotate as in ordinary disk harrows, and so that the concave faces of the blades are faced in the same direction. The complete sections of the tool are designated 20, 20A, 20B and 20C. In assembling the frames, disk blades, axle, spacers and bearings, all of which are not shown herein in detail, I prefer to follow the plans and specifications embodied in the following patents granted to me, to wit: U. S. Patent No. 2,006,547, for Offset disk harrow, issued July 2, 1935, and U. S. Patent No. 2,020,545 for Thrust bearing for disk cultivator, issued Nov. 12, 1935. Other forms can be used for assembly of said sections.

In the bedder herein referred to I have arranged sections 20 and 20A to function together by being arranged endwise, spaced apart and hingedly connected as hereinafter more fully described, with the concave faces of the disk blades on section 20 facing the opposite direction to the faces of the disk blades on section 20A. It is noted that in making earthen beds for planting vegetation, or for making ridges, the disk blades on the two cooperating sections should be positioned to throw the ground toward the center line of the tool, and the bed or ridge thus made should slope upward from either side toward the middle line, and in tearing down, or leveling the beds or ridges, the blades should be arranged so that the earth is thrown away from the center line of the tool.

For the purposes hereinafter more fully explained I have provided standards 13 and 14 which are attached to the frame of section 20 at approximately right angles to the plane of said frame. Standards 13 and 14 are connected at the top with bar 16, which bar is pivotally attached at either end to the standards, the pivotal attachment adapting bar 16 to have a torsion movement. On the cooperating section 20A are standards 13A and 14A, said standards being connected with bar 16A as described above. A tie 15 connects bars 16 and 16A with pins or bolts 15A. A plurality of holes 65 in bars 16 and 16A permits the varying of the position of tie 15 with said bars 16 and 16A. This form of connection acts as a hinge and permits a limited rotary movement of tie 15 with bars 16 and 16A on a plane common to said bars and tie.

A tongue 21 is positioned along a line approximately midway between said sections 20 and 20A. At one end of said tongue is a ring to which draft means not shown can be attached. The other end of the tongue terminates with a loop 21B to which sections 20 and 20A are hingedly attached. The form of hinge shown and preferred to connect the sections to the end of the tongue is a ring, or eye 30 or 30A engaged with the loop 21B, which permits the sections thus connected to have a limited universal movement, so they can be angled either vertically or horizontally.

The means for attaching sections 20 and 20A with loop 21B consists of an arm projecting from each of frames 20 and 20A. These arms are preferably adjustable as to length. On section 20 the arm consists of straps 27 and 28, having a plurality of holes 66 adapted to receive bolts 29 for clamping the straps together. The free end of strap 28 terminates with ring or eye 30 which engages with loop 21B as hereinbefore described. The combination of straps 27 and 28 and the duplicate combination of straps 27A and 28A, and loop 21B forms a spacer for said cooperating sections.

The usual form of hitch can be adapted for this tool, to-wit: tongue 21 hereinbefore described, and braces 22 and 23. Braces 22 and 23 are also used to angle the cooperating sections. They are pivotally attached at one end to the frames of sections 20 and 20A, and the other ends are pivotally attached to a block 24. Block 24 is adapted to slide on the tongue 21, and to be locked thereto with a pin 25 which passes through a hole in the block and through one of a plurality of holes 25A in the tongue. Other means for locking the sliding block to the tongue can be used, such as is shown in Fig. 6, in which lever 60 is pivotally attached to block 24 in such relation that pin 25, which is attached to the lever, can be inserted through the hole in the block, or withdrawn therefrom by the movement of lever 60. This lever can be manipulated by rope 61, which rope can extend to the driver's seat on the tractor operating the tool. The tractor and driver's seat thereon are not shown on the drawings herein.

It is noted that in my preferred construction connecting links and spacer joining sections 20 and 20A, consisting of straps 27 and 28 on section 20, and straps 27A and 28A on section 20A, and loop 21A should be on a parallel plane with, and vertically spaced from the auxiliary spacer and tie 15. The object of this construction is that when cooperating sections 20 and 20A are angled to working relation by means of braces 22 and 23, these sections are also angled vertically with the inside disk blades being positioned higher than those on the outside, leaving the beds thus formed higher along the center line than along the sides. This is accomplished by reason of the fact that the space maintained by tie 15 is invariable, at all angles of the disk sections, while the space maintained by the arms attached to the frames and pivotally connected at the free ends varies as the degree of angle fixed for the cooperating sections may vary.

It is also noted that if there is unevenness in the earth's surface being worked which prevents the two sections from rolling on approximately the same plane, and when the cooperating sections 20 and 20A are angled with relation to each other, the torsion movement permitted in bars 16 and 16A, and the hinge movement of tie 15 compensates for such varying positions and at the same time maintains a rigid position as spacers between said sections.

In tools of this character it may be desirable to connect a plurality of sections, end to end, which can be done, but in assembling such sections it should be noted that alternate sections are reversed as to the direction in which the concave faces of the disk blades face.

It is also noted that frequently it is desirable to assemble a plurality of pairs of sections as shown in Fig. 1. To accomplish the purpose desired with my tool, all sections arranged in a line one behind the other should have the concave faces of the disk blades face in the same direction. The means for connecting the cooperating rear sections 20B and 20C, which are placed end to end in the same general form as for connecting and spacing front sections 20 and 20A, except in lieu of the tongue and loop 21B, a tongue link 41 is substituted by being hingedly connected to the end of the tongue, said tongue link 41 terminating at the end with a loop 21C to which arms 27 antd 27A are hingedly attached. Arms 27 and 27A on the rear pair of sections are preferably made slightly shorter than the corresponding arms on the front pair of sections so the disk blades in the front sections and the rear sections are not truly aligned.

Rigid links 50 connect the rear sections with the sections directly in front thereof. Links 50 should be pivotally attached at one end to the bracket 43, which bracket is attached to the frame of a section. These links should be of such length that the rear cooperating sections can be angled the same as the front sections.

In Fig. 1 the disk blades are positioned so that the concave faces of cooperating sections face each other. They are arranged so that when the sections are angled the earth moved will be thrown toward the center line of the tool, and make a bed or ridge. If it is desired to reverse this action and to throw the earth away from the center line and level the ridge, or bed, the cooperating sections are reversed so that the concave faces of the disks face outwardly. Lugs 45 on each of the sections are adapted to be connected with a link. In said reversed position links 50 are disconnected from brackets 43, and connected to brackets 42. If the tie 15 is removed the tool becomes the ordinary form of disk harrow. Provision is made by using selectively holes 67 for attaching the tie 15 to angle the disk sections vertically to the angle desired.

In Fig. 5 is shown an adjustable form of tie. This form is constructed of two parts, 70 and 71, which terminate with a right and left screw, which is connected by the usual form of looped nut 73, having a female right and left thread in the two ends.

Having described my invention I claim:

1. An earth working tool comprising a plurality of sections, each section consisting of a frame and a plurality of disk blades rotatingly mounted therein, with the concave faces of the blades facing in the same direction, said sections being assembled in pairs, the sections forming said pair being hingedly connected, end to end, a spaced distance apart, with the concave faces of the disk blades on the two sections of the pair facing opposite directions, an auxiliary spacer and tie connecting said two sections consisting of upright supports attached to the frames, a rigid tie pivotally attached to the supports at either end of the tie, with a universal hinge, means for angling the sections of each pair relative to each other, and means for attaching draft means.

2. An earth working tool comprising a plurality of sections of a disk harrow, each section consisting of a frame having a plurality of disk blades mounted therein with like faces of the disk blades facing the same direction, said sections being hingedly connected in pairs, the sections being arranged end to end, with the blades on the one section facing the opposite direction from the blades on the other section, means for connecting and spacing said sections apart consisting of a rigid arm attached to each frame, said arms being hingedly connected, auxiliary means for spacing said sections apart consisting of an upright support on each section, a tie and spacer hingedly connected at either end to the upright support on cooperating sections, the hinge connections on the arms, and on the tie adapting the sections to be angled vertically and horizontally, means for angling the sections on each pair, and means for attaching draft means.

3. A device described in claim 2, in which a plurality of pairs of sections are assembled, one pair approximately behind the other, each section being attached to the section directly in front by means of pivotally mounted links.

4. An earth working tool comprising a plurality of sections of a disk harrow, each section consisting of a frame having a plurality of disk blades rotatingly mounted therein, like faces of the disk blades facing the same direction, said sections being hingedly connected in pairs, the cooperating sections being arranged end to end, with the concave faces of the blades on one of said pair of sections facing the opposite direction of the concave faces of the disks on the other section, means for spacing the cooperating sections apart endwise consisting of a rigid arm adjustable as to length attached to each frame, said arms on adjacent sections being hingedly connected at the free ends thereof, auxiliary means for spacing said cooperating sections apart consisting of an upright support on each section, a tie and spacer adjustable as to length hingedly connected at the ends to the upright support on the connected sections, the hinge connecting the arms, and the hinges at either end of the tie adapting the sections thus connected to be angled vertically and horizontally, means for angling sections which are hingedly connected, and means for attaching draft means.

5. An earth working tool comprising a plurality of sections of a disk harrow, each section consisting of a frame having a plurality of disk blades rotatingly mounted thereon, the concave faces of the disk blades facing the same direction, said sections being hingedly connected in pairs, the sections in each pair being positioned end to end, a spaced distance apart, with the blades in one section of the pair facing the opposite direction from the blades of the other section, an auxiliary connection and spacer consisting of upright posts attached to each section of each pair, a tie hingedly attached at the ends to posts on the two sections forming the pair, pairs of sections being arranged one behind the other, the concave faces of the blades on the rear sections facing the same direction as the concave faces of the blades on the section directly toward the front, links pivotally connecting the front and rear sections, means for angling the sections on each pair, and means for attaching draft means.

6. A tool described in claim 5 in which the length of the hinged connection of sections forming the front pair slightly vary from the length of the connection of sections forming the rear pair, adapting the front and rear sections to travel with the blades slightly out of line.

7. An earth working tool comprising a pair of sections of disk blades rotatingly mounted in a frame, spacing arms attached to the frames, the free ends of said arms being hinged together, upright posts on each section of the pair, a rigid tie hingedly connected to the posts on the sections forming the pair, said hinges adapting the sections forming the pair to angle vertically and horizontally, means for angling said sections relative to each other, means for holding said sections in angled relation, and means for applying draft means.

8. A tool described in claim 7 consisting of a plurality of pairs of sections linked end to end, the concave faces of the disk blades in connected sections being alternately reversed.

9. An earth working tool comprising a pair of sections of disk blades rotatingly mounted in a frame, spacing arms attached to an end of each section, said sections being arranged end to end and the arms of adjacent sections being pivotally connected, an auxiliary rigid spacing bar pivotally attached at either end to the sections forming the pair, means for angling adjacent sections, means for holding said sections in selective angled relation, and means for attaching draft means.

10. An earth working tool comprising sections of a disk harrow, spacing means consisting of arms attached to and extending from said sections, the arms being pivotally attached at a point between the sections, an auxiliary spacer consisting of a rigid bar pivotally attached at either end to a support attached to each of said sections at approximately right angles to the arms.

11. In an earth working tool of the character described, consisting of pairs of sections of a disk harrow, each section comprising a plurality of disk blades rotatingly mounted in a frame, duplicate means for holding said sections together in a spaced relation consisting of arms attached to each of said frames, the arms being hinged together between said sections forming the pair, a rigid bar or tie hingedly connected at each end to a support, the supports being attached to the frames of the sections forming the pair at an angular relation to the arms, and adapted to hold the tie a spaced distance from the arms, the hinges connecting the sections and connecting the tie to the supports being adapted to permit said sections to be angled relative to each other either vertically or horizontally, means for angling the sections forming the pair, means for holding said sections in angular relation, and means for attaching a draft to the tool.

WILLIAM E. GOBLE.